United States Patent [19]
Sherman

[11] Patent Number: 4,765,091
[45] Date of Patent: Aug. 23, 1988

[54] COLLAPSIBLE RODENTICIDE BAIT STATION

[76] Inventor: Daniel A. Sherman, 1355 Bobolink Pl., Los Angeles, Calif. 90069

[21] Appl. No.: 168,937

[22] Filed: Mar. 16, 1988

[51] Int. Cl.$^4$ .............................................. A01M 1/20
[52] U.S. Cl. .................................................... 43/131
[58] Field of Search ............... 43/114, 124, 131, 132.1

[56] References Cited

U.S. PATENT DOCUMENTS

| | | | |
|---|---|---|---|
| 2,532,681 | 12/1950 | Stover | 43/131 |
| 2,763,093 | 9/1956 | Scott et al. | 43/131 |
| 3,750,326 | 8/1973 | Haubtmann | 43/131 |
| 4,026,064 | 5/1977 | Baker | 43/131 |
| 4,261,132 | 4/1981 | Carothers et al. | 43/131 |

Primary Examiner—M. Jordan

[57] ABSTRACT

This invention relates to the containment of rodent baits in a protected container that can easily be serviced by authorized technicians and one that presents baits to a target rodent population. Specifically, the device is designed to provide a pest control operator with a highly effective and protective containment structure that can be adopted to numerous forms of rodent baits and one that can be knocked down to form a relatively flat package when not in use. This use of a knock down device provides the user with a device that can be efficiently stored prior to installation and one that can be shipped economically over long distances. The use of two separate gates or containment sections allows the refill of only that section of the bait structure that may have been attacked by the rodents and conserves the use of bait to the actual feeding patterns of the rodent population. Additionally, the use of separate, removable compartments allows for ease of refill and for the mixing of types of rodenticides to best measure the effect of the various forms on the target population and to present that form that the rodents find to be most palatable.

5 Claims, 3 Drawing Sheets

COLLAPSIBLE RODENTICIDE BAIT STATION

BACKGROUND OF THE INVENTION

The use of rodent bait stations to house and present bait to a rodent population has steadily increased through the years due to the increased toxicity of rodent baits and the need to isolate these poisoned substances from contact with the environment.

Most common are the types of bait stations that contain a cover unit that caps the baiter, along with a separate feeding tray, that allows for the distribution of bait in the tray elemement.

Various maze type baffles and internal structures have been designed to inhibit tampering with the contents and the more popular bait stations contain internal tray structures that hold the bait in a selected area.

The structures and designs of the most advanced of these bait stations are characterized in patents; 43/131 U.S. Pat. No. 4,132,026 1/1979 Dodds, 43/131 U.S. Pat. No. 4,161,079 7/1979 Hill, 43/131 U.S. Pat. No. 4,349,981 9/1981 Sherman, 43/131 U.S. Pat. No. 4,349,982 9/1982 Sherman, 43/131 U.S. Pat. No 4,400,904 8/1983 Baker, 43/131 U.S. Pat. No. 4,541,198 9/1985 Sherman, 43/131 U.S. Pat. No. 4,648,201 Sherman and foreign patent 43/131 No. 2111022 9/1972 Federal Republic of Germany All of the above patents advanced the state of the art in bait containment and presentation but were bulky to ship and basically allowed the convenient use of only one type of bait at a time.

Even when two compartments were present, the proximity of the compartments to one another led to the intermingling of baits and to possible competition for the food sources when more then one rodent entered to feed.

Additionally, the bait trays were an integral part of the structure of the unit which made the filling of the baiters more difficult and led to the overuse of baits because of the propensity of the user to fill both compartments, even when one had not been attacked by the rodents.

The instant invention provides the user with a bait containment structure that can be easily loaded from either end, has the facility to conveniently use more then one type of bait, ie; blocks or granular, shields the bait from prying hands, allows two or more rodents room to feed at the same time and can be knocked down and stacked for ease of shipment and storage.

Additionally, the unique entrance portals act to shield the bait trays from the exterior while providing the longest distance from the opposing portal, thereby allowing a rodent the most space in which to feed and preen as it consumes the bait.

The use of two distinctly separate compartments, spread at opposing ends of the structure makes the loading of bait more efficient because only one side of the unit need be opened and that being the side that bait has been consumed.

In general, the instant invention teaches a method of construction and design that more efficiency presents rodent bait to the target species and one in which a methods of novel bait distribution is demonstrated.

This, along with the unique qualities inherent in the two open ends, brings a new dimension to bait containment and efficient usage.

The scope of the teachings are not limited by the narrative alone but, along with the drawings demonstrates significantly advanced features that are not found in stations that are available today.

DETAILED DESCRIPTION OF THE DRAWINGS

Figure 1:
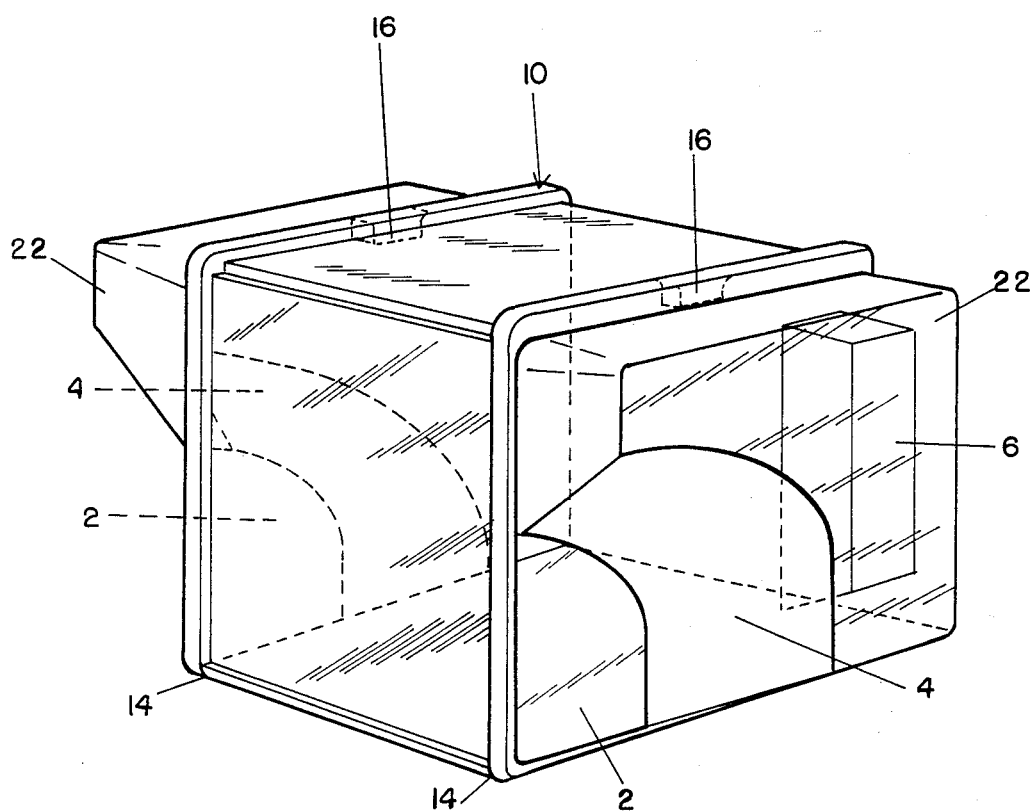
FIG. 1 depicts the overall construction of the bait containment device and shows the set back formed by the recessed entrance portals. Also shown is the positioning of the removable bait holder that are positioned on opposing walls and the blocking mechanism that allows each of the opposing side walls to be released for easy of reloading.

In FIG. 1 the collapsible bait station is shown generally as 10, a box shaped structure with two independent folding sides 22 and an entrance and egress portal 2 that is contained within the structure of the folding sides 22 at opposing ends of the baiter. These portals 2 are recessed by forming the walls of the folding side 22 with a recessed section 4. Located at the bottom of each of the folding walls 22 is a flangable groove 14 which allow the sides 22 to be dropped for insertion of an independent bait holder 6. The top of the folding sides 22 are held in place by a latch 16 located at the top of the folding sides 22.

Figure 2:
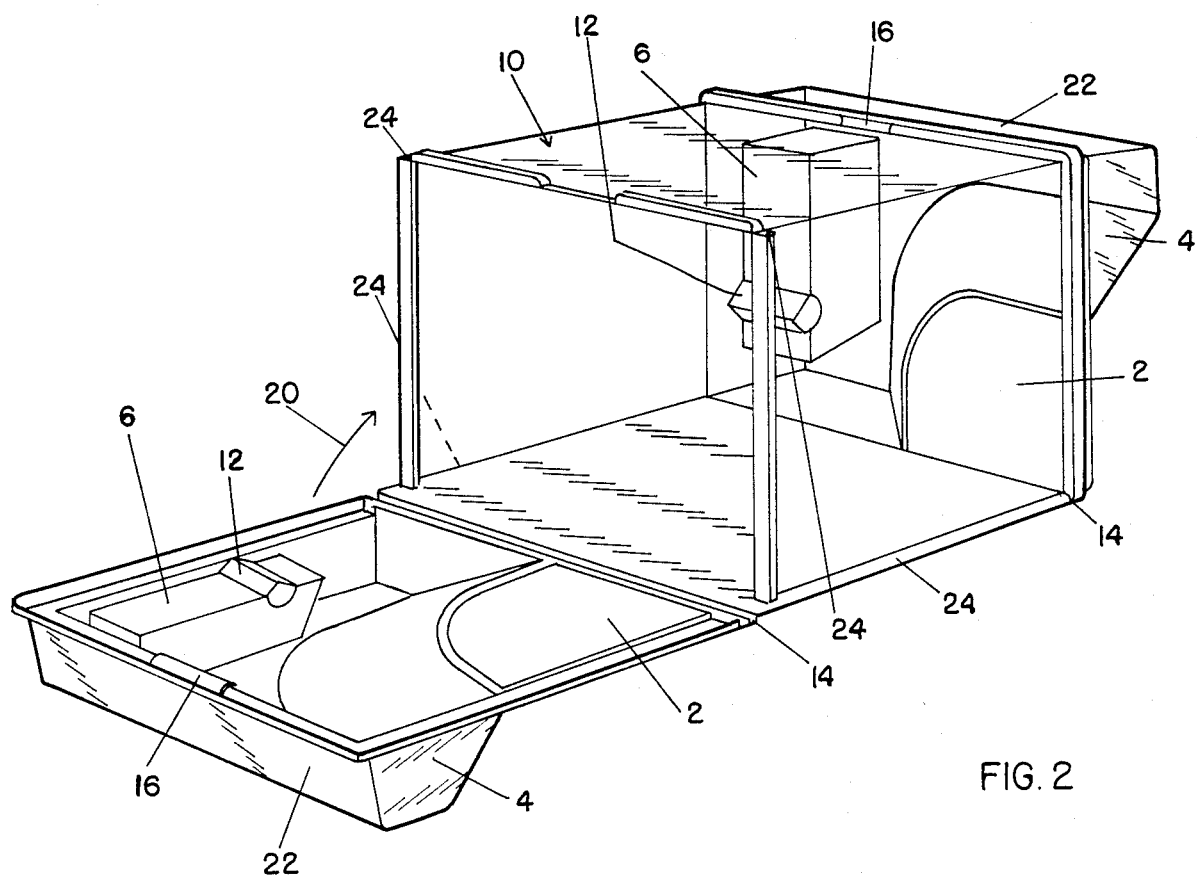
FIG. 2 demonstrates how the side wall structure is released to allow the replacement of of bait holder and demonstrates how the bait holder is placed within the recess formed by the set back of the entrance portals.

In FIG. 2 we see depicted a side perspective of the collapsible bait station 10 with one of the folding walls 44 in the open position. The interior of the folding wall 22 is depicted to demonstrate the positioning of the bait holder 6 which contains the poisoned substance 12 and to show how this bait holder 6 is recessed into the structure of the folding wall 22 by the section formed by the recess 4. Also depicted is the use of the flangable groove formed as 14 which runs along the base of the folding wall 22, allowing the folding wall 22 to drop while still being connected to the body the structure.

The portal 2 on the folding wall 22 that is depicted to the left of the drawing now faces the base while the portal 2 on the right side of the drawing in the folding wall 22 remains in an upright position. The locking mechanism 16 is shown in the fully closed position at the top of the main structure and is used to hold the folding walls 22 in place when the collapsible baiter is in its fully enclosed configuration and ready for use. The relationship of the bait holders 6, containing the poisoned block 12 is demonstrated and an additional series of flangable grooves depicted as 24 provide the ability to allow the center structure to be folded as will be demonstrated in further art.

Figure 3:
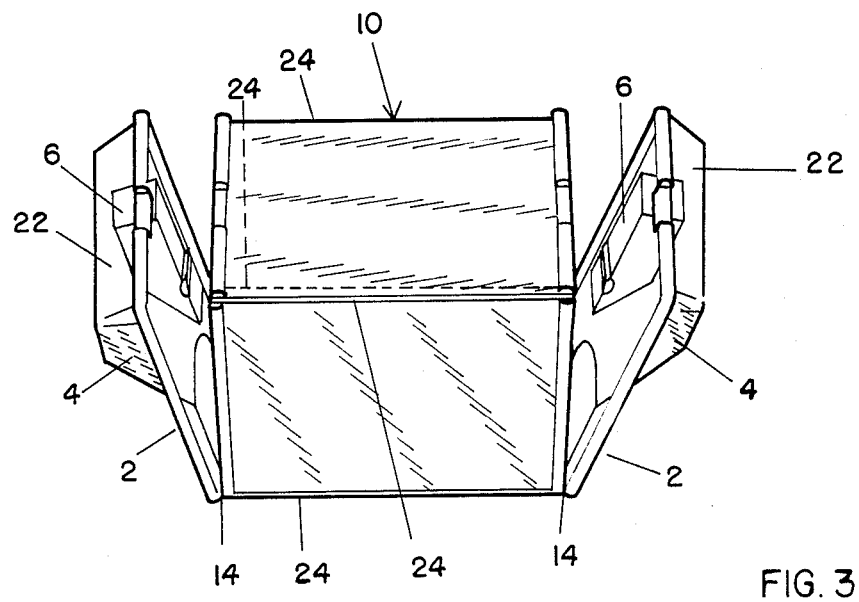
FIG. 3 show both sides being dropped to allow total access to the bait compartment and how the middle structure is a free standing unit that acts to form a totally integrated structure only when the sides are snapped into place.

In FIG. 3 we see the collapsible baiter 10 with both of the folding walls 22 in a partially open position. Both walls have been released and are held to the main body by the flangable groove 14. The latches 6 that cooperate with the main structure of the baiter have been released allowing walls 22 to open from each of the opposing sides. Noted in this drawing are the positions of the flangable grooves 24 and the relationship of the bait holder 6 which now appear in the recesses of the folding wall 22 at each opposing side.

Figure 4:
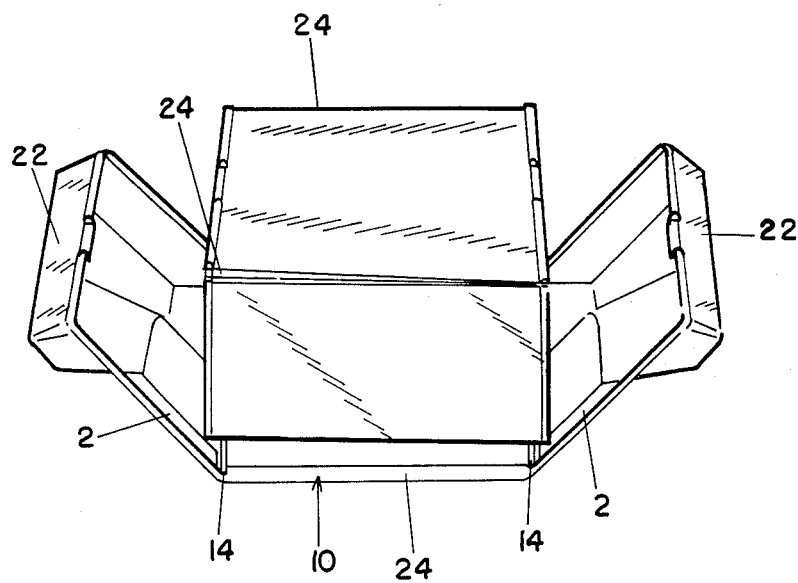
FIG. 4 is a representation of the middle structure being folded flat to allow shipping of the unit. Also depicted is the sides being opened with the bait holders having been removed so as to allow nesting of the knocked down unit for transport.

FIG. 4 demonstrates the baiter 10 as it is being collapsed along the walls of the main body and along the flangable grooves 24. As the main structure is pushed back the grooves 24 allow the body of the baiter to fall backwards and lie in a flat position. The folding walls 22 are the opened and fold flat along their own groove as indicated as 14.

Figure 5:
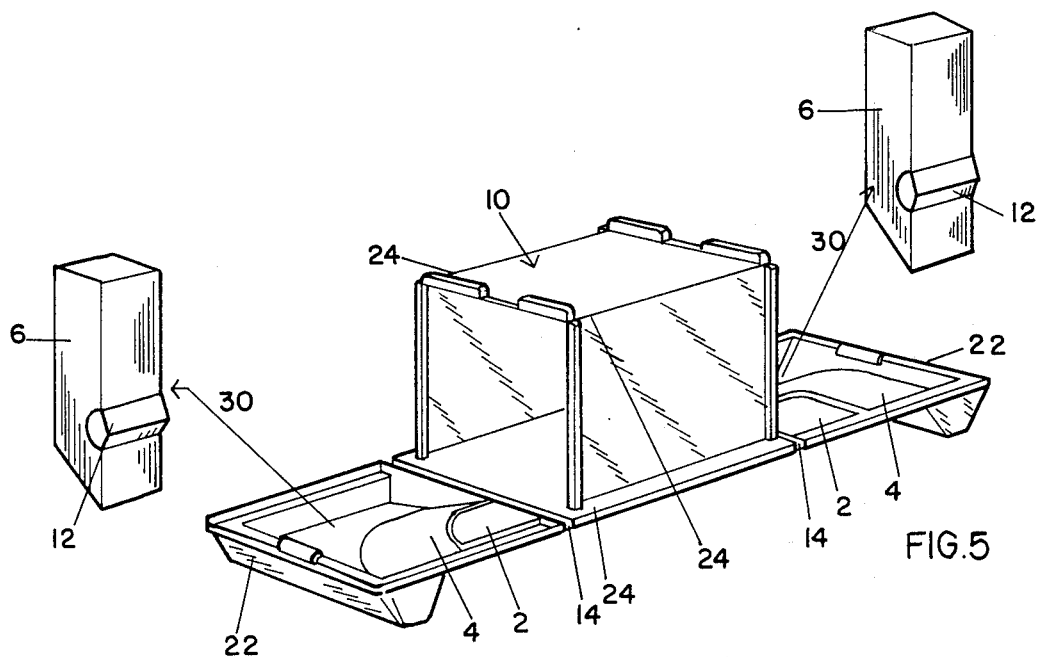
FIG. 5 depicts the side in the full open positon and the relationship of a set of flangable grooves to the total structure. Depicted is the bait holder and the relationship of these holders to the overall structure of the baiter.

In FIG. 5 we see the component makeup of the baiter 10 with both of the folding walls 22 in a fully knocked down or opened position along the grooves formed as 14 with the bait holders 6 containing the poisoned bait 12 having been removed for separate storage or reloading 30. The construction of the folding wall 22 and the recesses formed in said wall by 4 now act to cooperate with another baiter 10 that might be placed on top of it to form a tightly packed shipping container when the main structure has been folded down along the grooves depicted as 24.

Figure 6:
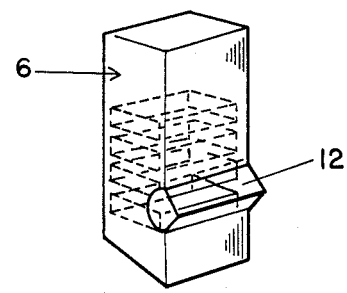
FIG. 6 is a depiction of the bait holder itself, which is designed to hold either a granular type of bait or a block of bait as depicted in the drawing.

FIG. 6 shows the basic construction of the bait holder 6 which is tubular in shape with a single front opening that allows the poisoned bait 12 to be reached by the target rodent. This bait holder 6 is totally removable from the baiter 10 and can be shipped either filled with the poisoned block 12 or can be filled on site with a block separate from the baiter.

What I claim is:

1. A station for the containment of rodent bait; said station comprised of a center member; said member cooperating with two folding sides; said sides comprised of entrance and egress portals; said portals being recessed to form an interior pocket containing an independent bait holder; said bait holder being capable of being removed from said station for reloading.

2. A station for the containment of rodent bait as in claim 1; said station having a center section containing flangable grooves that allows said center section to befolded flat when said folding sides are released.

3. A station for the containment of rodent bait as in claim 2, said station containing folding sides; said sides containing flangable grooves that allows said sides to be folded outward to form a flat configuration when disengaged from said center section.

4. A station for the containment of rodent bait as in claim 3; said station having folding sides; said sides containing a locking device that cooperates with said center section to form a tightly integrated unit capable of withstanding tampering by rodents and unauthorized personnel.

5. A station for the containment of rodent bait as in claim 4; said station contructed of translucent material to allow the passage of light for the inspection of the contents and bait levels without the removal of said folding sides.

* * * * *